Figure 1:
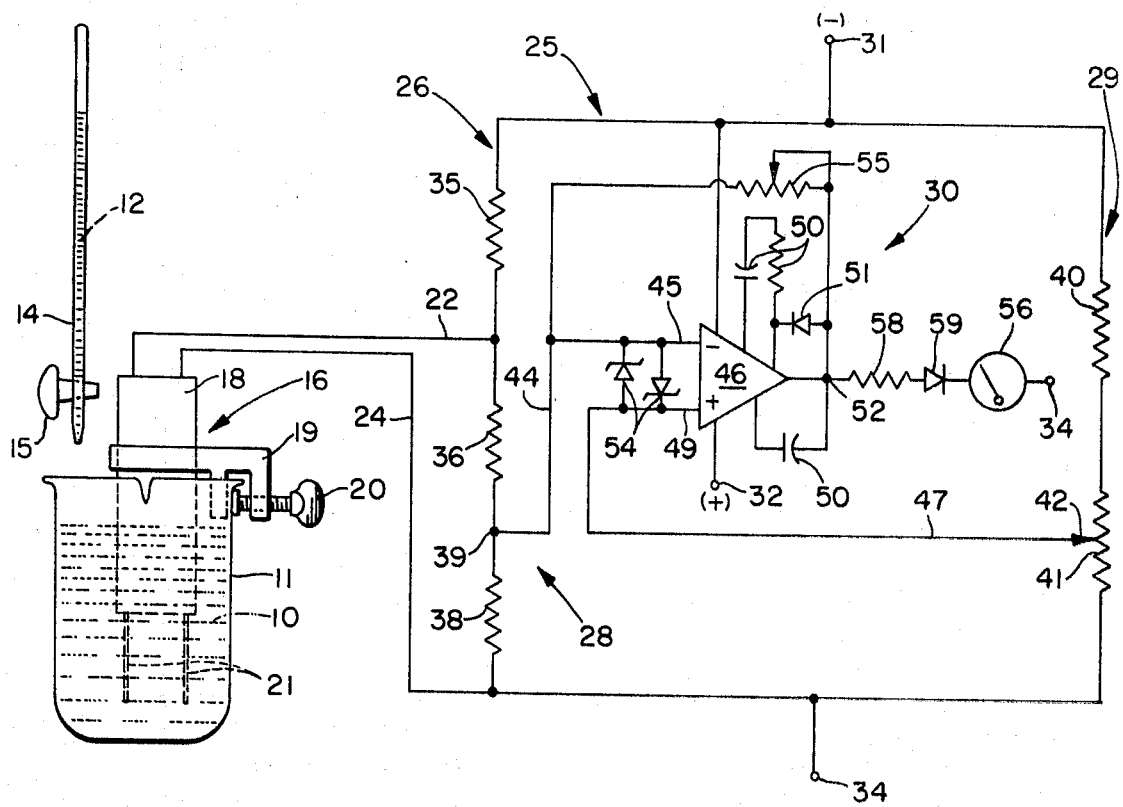

United States Patent

[11] 3,593,119

| [72] | Inventors | Thomas W. Brum<br>North Madison;<br>Frank D. Cochran, Mentor, both of, Ohio |
|---|---|---|
| [21] | Appl. No. | 828,596 |
| [22] | Filed | May 28, 1969 |
| [45] | Patented | July 13, 1971 |
| [73] | Assignee | The Lubrizol Corporation<br>Wickliffe, Ohio |

[54] ELECTRONIC TITRIMETER
3 Claims, 2 Drawing Figs.

[52] U.S. Cl. .................................................. 324/30 R, 204/1 T
[51] Int. Cl. ............................................. G01n 27/42
[50] Field of Search .......................................... 324/30, 123, 29; 204/1 T; 330/30, 69

[56] References Cited
UNITED STATES PATENTS
| 2,972,102 | 2/1961 | Dubois ........................ | 324/30 |
| 3,441,490 | 4/1969 | Johansson .................. | 324/30 X |

Primary Examiner—Michael J. Lynch
Attorneys—Roger Y. K. Hsu, William H. Pittman and James W. Adams, Jr.

ABSTRACT: Apparatus for electronically standardizing titration techniques by evaluating end point conditions utilizing a high gain, normalized, conductivity sensor comprising a pair of platinum electrodes immersed in the solution being titrated for affecting current conditions in a sensing circuit, the characteristics of the circuit being monitored by a variable gain integrated circuit operational amplifier and DC meter indicating combination.

INVENTORS
THOMAS W. BRUM
FRANK D. COCHRAN

BY
Oberlin, Maky, Donnelly & Renner
ATTORNEYS

3,593,119

ELECTRONIC TITRIMETER

This invention relates to monitoring apparatus and more particularly to an electronic circuit arrangement for measuring the end point of a titration analysis wherein the conductivity of a solution attains a normalized condition upon the introduction of a sufficient quantity of titrant, it being usually desired that the quantity of titrant be measured as an evaluation of the chemical reaction occurring.

While the titration procedure is used extensively in chemical analyses, such procedure may be performed on a somewhat subjective basis and may require extraneous materials or techniques. For example, some form of indicator, such as a phenolphtalein visual indicator in an acid base titration may be added to the solution being titrated to provide the visual indication of normalcy of the solution or the use of test strips may be employed. Such procedures are especially deficient from the standpoints of both accuracy and reproducibility and there has been a longfelt need for a form of apparatus which would improve the qualitative characteristics of such procedures.

It is known that the electrical conductivity of a solution may be one measure of the particular characteristics thereof and it would be advantageous to standardize on such level of conductivity as a reference end point, especially in titration analyses. The change in conductivity of the solution is a useful measurement technique in other than the acid base titration analyses mentioned and finds use in the Karl Fisher water, bromine number and other procedures commonplace in the chemical field.

It is also known that standardization of testing may be realized by electronic means as in the past transistorized amplifiers and related circuit arrangements have been utilized for measuring conductivity of solutions. However, these circuits have been found deficient, at least, in being especially susceptible to variations in temperature and although compensating techniques are known and available, are unwieldy and uneconomical for the typical laboratory procedure.

There is a need for suitable measurement apparatus and techniques for standardization of the titration analysis over a wide variety of environmental conditions and types of analyses and it is an object of this invention to provide such apparatus which primarily improves the accuracy of the titration technique but also provides the advantage of reproducibility of testing.

It is another object of this invention to provide titration analysis apparatus which is more economical and adaptable than prior art devices and which exhibits a superior freedom from environmental conditions than known devices.

It is yet another object of this invention to provide improved titration analysis apparatus which advantageously utilizes the extremely high gain and compensated characteristics of a solid-state integrated circuit operational amplifier in an electronic circuit requiring a minimum of additional components.

It is a yet further object of this invention to provide improved titration analysis apparatus and a technique of testing which requires no additional chemical ingredient in the solution as an indicator of conductivity, neutralization, or the like and which is conveniently adaptable to many different types of titration analyses.

Figure 2:
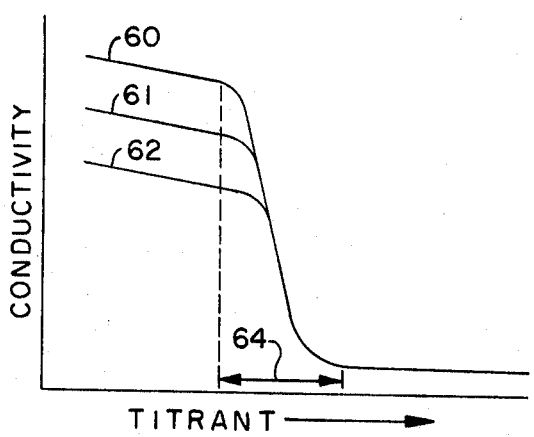

In the single sheet of drawing:

FIG. 1 is a schematic representation of such titration analysis apparatus including an electronic circuit diagram of the preferred embodiment of the invention; and FIG. 2 is a graph showing a family of curves representing the conductivity characteristics of several different solutions and indicating the operating range of the electronic circuit.

Referring now to FIG. 1, in a typical environment for this invention the solution 10 to be titrated is contained within a vessel 11 such as the conventional glass beaker. The titrant 12 to be added to the solution 10 is contained in a burette 14 which comprises a graduated hollow rod having a stopcock 15 at the lower portion thereof for controlling the release of titrant into the beaker. Under the influence of gravity either a steady stream of the titrant 12 may be added to the solution 10 or near the end point of the analysis, control may be made on a drop-by-drop basis.

Sensing of the conductivity of the solution 10 is performed by way of an electrode assembly or probe 16 in contact with the solution. In this embodiment of the invention the probe 16 is a rod 18 of insulative material secured to the side of the beaker 11 by a suitable bracket 19, formed of plastic or the like, including a thumbscrew clamp 20. The rod supports a pair of electrodes 21 which are fully immersed in the solution 10.

The electrodes 21 comprise two rods of conductive but inert material, preferably of platinum, and spaced a small distance apart to achieve contact with sufficient solution to be representative of the total volume of solution 10 in the beaker 11. Complete immersion of the electrode 21 surface area provides a common area of contact with the solution 10 effecting a standard condition when different analyses are to be performed. The electrodes 21 connect internally of the insulative rod 18, to a pair of lead in wires 22, 24 which are of suitable length for transmitting current between the testing area and the location of the electronic circuitry and remote indicator, shown generally at 25.

The circuitry comprises a portion 26 for developing a signal in the electrode assembly, a further circuit 28 for sensing the voltage occurring across the electrodes 21, a voltage divider 29 for generating a reference signal indicative of a desired end level of conductivity of the solution and an amplifier circuit and meter readout combination 30 for providing a visual indication of the desired characteristic of the solution. While variations are possible in the circuit components and interconnections, a preferred embodiment of the circuit is depicted in FIG. 1 representing the optimum circuit for achieving an accurate and reliable measurement of the titration analysis.

A source of power (not shown) energizes the circuit and comprises any well-regulated device for providing suitable levels of DC voltage for connection to appropriate terminals within the circuit indicated at 31 as a negative voltage terminal, at 32 as a positive voltage terminal and at 34 as a ground or common terminal. With the circuit arrangement depicted a suitable level of voltage would be positive and negative 15 volts at terminals 32, 31, respectively, such potentials being obtainable from a battery source or a conventional AC power supply circuit having good regulation features.

A first resistor 35 is connected in series between the negative terminal 31 of the power source and one of the electrodes 21 of the probe 16 via wire 22, the second of the electrodes 21 being connected to the common terminal 34 via wire 24. Such circuit arrangement establishes a polarizing current flow through the solution 10 being titrated of approximately 10 microamps of current and simultaneously develops a voltage across the connecting wires 22, 24 of approximately 1 volt in amplitude. Further connected across the wires 22, 24 and thus the electrodes 21, are series connected fixed resistors 36, 38 having a common junction 39 therebetween, acting in part as a voltage divider for application of a smaller voltage to further circuitry. Approximately 1 microamp of current will flow through the series resistors 36, 38 which have values of 1 megohm and 82.5 kilohm, respectively, and will combine with the probe current for developing the voltage drop across resistor 35.

In this arrangement the effective resistance of the solution 10 between the probe electrodes 21 is on the order of only several hundred ohms which in comparison with fixed resistor 35, which is on the order of 1.25 megohms, is sufficiently small so that variations in conductivity of the solution 10 as titrant 12 is added, up until the end point of the titration, are relatively insignificant and do not affect substantially the polarizing current flow through the probe electrodes 21. The resistor 35 thus acts as a regulating device for the probe current and as will be described in greater detail maintains a voltage drop across resistors 36, 38 at the end point of the titration analysis.

The voltage divider 29 comprises a fixed resistor 40 and a series potentiometer 41 connected between the negative voltage terminal 31 and the common terminal 34 to provide a reference voltage at the slider 42 of the potentiometer 41 as a measure of the end point of the titration. In this arrangement of the circuit, resistor 40 is on the order of 1.0 megohm in resistance while the potentiometer 41 is on the order of 20 kilohms such that a voltage of up to approximately 0.3 volt is available at the slider 42.

The voltage at terminal 39 proportional to the voltage drop across the electrodes 21 is applied by way of line 44 to one input 45 of an integrated circuit operational amplifier 46 while the voltage at the slider 42 is applied by way of line 47 to the second input 49 of the amplifier 46, in opposition to the first. The operational amplifier 46 may be any one of many different types available but is characterized by having extremely high gain and a wide band frequency characteristic. As indicated in FIG. 1, the amplifier 46 receives suitable operating potentials from the terminals 31, 32 and further includes frequency-compensating 50 and amplifier-modifying components connected to various inputs thereof as is well understood in the art. Thus, a diode 51 is connected between the output terminal 52 of the amplifier 46 and one of the inputs to provide protection against latchup. A pair of zener diodes 54 are connected back to back across the two inputs 45, 49 of the amplifier 46 to limit the differential input voltage received from the input lines 44, 47 to protect the internal circuitry of the amplifier 46.

The amplifier and readout circuitry 30 further includes a variable resistor 55 connected between the output terminal 52 of the amplifier 46 and one input 45 and output indications are realized at a DC meter 56 connected between the common terminal 34 of the power source and the output terminal 52 of the amplifier 46 in series with a fixed resistor 58 and a diode 59. The resistor 58 is utilized to limit the output current to a safe value and the diode 59 to eliminate below zero readings on the meter 56. As is well understood in this art the variable resistor 55 acts as a gain control for the amplifier 46 feeding back a portion of the signal appearing on the output terminal 52 to the input terminal 45.

The amplifier 46 thus acts as a form of difference amplifier providing an output signal at terminal 52 for driving meter 56 as a function of the signals appearing at the input terminals 45, 49 and the gain of the amplifier as determined by variable resistor 55. While standard difference amplifier or voltage comparator circuits are well known in the art, the circuit of this invention is especially advantageous in the titration analysis or in any environment where a similar characteristic is to be monitored.

Referring to FIG. 2 the several curves depict the typical conductivity characteristic of a titration analysis wherein conductivity of three different solutions are represented by curves 60—62 as titrant is added to the solutions. The initial relative conductivity of the solutions varies from high to low in curves 60—62 respectively and all exhibit a gradual decrease until a zone is reached, indicated at 64, where conductivity changes rapidly to a lower level. In an acid base titration, for example, such zone 64 represents neutralization of the solution and the desired end point for the analysis. In practice, such zone 64 may represent the addition of an appreciable volume of titrant, affecting the accuracy of the measurement, and it is desirable to be able to detect the change in conductivity of the solutions within this zone.

In the circuit of FIG. 1, the current through the electrodes 21 and thus the voltage at wires 22, 24 exhibits a similar rapid transition. The voltage at junction 39 remains at a relatively low level until sufficient titrant 12 is added to solution 10 to achieve neutralization when the voltage will increase to a much higher level.

The reference or end point voltage at slider 42 is initially adjusted to a similar high level but sufficiently low to be within the neutralization zone 64 so that amplifier 46 will initially sense different voltages and provide a high output at terminal 52. As the voltage at junction 39 becomes greater amplifier 46 will sense the approach to the level of the voltage at slider 42 to provide a minimal voltage at output terminal 52 and consequently a low indication at meter 56.

The typical titration characteristic change is further enhanced by the sensing circuitry 26, 28, in that as the low impedance of the solution 10 is effectively changed at neutralization to high impedance the impedance characteristics of resistors 35, 36, 38 will determine the voltage at junction 39.

In practice then, the operating procedure is to immerse the electrodes 21 in the solution 10 to be titrated to achieve a polarizing flow of current therethrough. Potentiometer 41 is adjusted to obtain a full-scale reading on meter 56, thereby determining the end point for the titration. The gain of the amplifier 46 may be adjusted also by variation of variable resistor 55 to achieve the full-scale deflection, if required, and is effective in setting an initial condition for different types of titrations. Then the titration analysis may be monitored by the visual indications of the meter 56, as titrant 12 is added to the solution 10, maintaining a high reading until the desired end point is achieved, whereupon the indication of the meter 56 will rapidly drop to a low level.

By means of this circuit arrangement, the titration analysis may be improved in accuracy to be repeatable within a few drops of titrant 12, and as indicated, considerably more accurate than prior procedures. Additionally, no other materials need be added to the solution 10, as an indicator which may affect the volume or chemical characteristics of the solution or at least require an additional step in the procedure. The reliability, accuracy and reproducibility of the titration analysis is thus enhanced considerably by the technique described providing also a convenient form of apparatus for laboratory use.

We, therefore, particularly point out and distinctly claim as our invention:

1. Apparatus for monitoring the end point of titration, comprising a pair of electrodes of predetermined surface area completely submerged in the solution, plural resistors in series connection forming a first voltage divider, means connecting said electrodes across a portion of said first voltage divider for energizing said pair of electrodes, a low voltage DC power source connected across said first voltage divider for creating current flow through the solution between said pair of electrodes, a second voltage divider, including a potentiometer, connected across said power source for creating a voltage level at the slider of said potentiometer determinative of a desired end point for the titration, a variable gain integrated circuit operational amplifier having a first input connected to a point on said portion of said first voltage divider and a second input connected to the slider of said potentiometer, said amplifier being operative to produce a voltage at the output terminal thereof related to the difference in voltages applied at said first and second inputs, a DC meter connected to said power supply and said output terminal for providing an indication of the voltage at said output terminal, and a variable resistor connected between said output terminal and said first input terminal of said amplifier for modifying the gain of said amplifier.

2. Apparatus as set forth in claim 1 wherein said first voltage divider comprises first, second and third fixed resistors in series connection, said first resistor being of relatively high impedance and connected to said power source, said second and third resistors being connected to said pair of electrodes and having a common connection at the first input of said amplifier.

3. Apparatus as set forth in claim 2 further including a pair of zener diodes in back-to-back connection across said first and second inputs of said amplifier for limiting the voltage difference.